3,526,286
MEANS FOR POSITIONING THE PRESSURE-TRANSMITTING JOURNALLING ELEMENTS IN WEIGHING MEANS
Rune Flinth, Vasteras, Sweden, assignor to Allmanna Svenska Elektriska Aktiebolaget, Vasteras, Sweden, a corporation of Sweden
Filed Dec. 5, 1968, Ser. No. 781,370
Claims priority, application Sweden, Dec. 14, 1967, 17,150/67
Int. Cl. G01g 5/04, 7/00, 21/10
U.S. Cl. 177—201          1 Claim

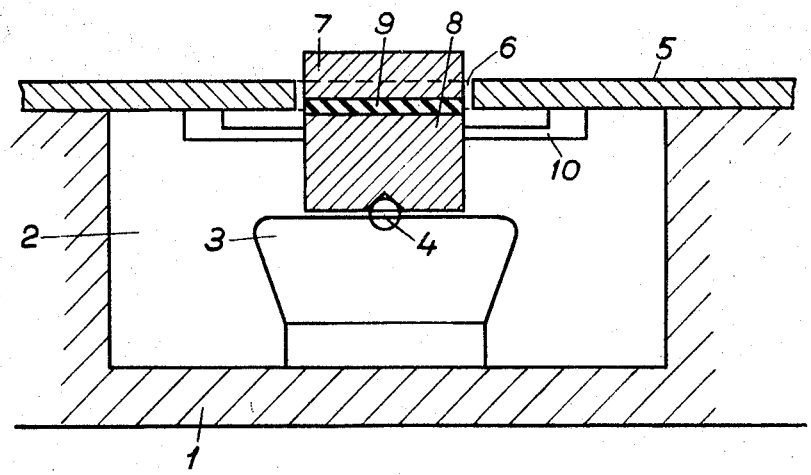

ABSTRACT OF THE DISCLOSURE

A load cell is positioned in a recess in a supporting member. A ball transmits force to be measured from a pressure transmitting block to the ball. The block is formed of two metal plates with a layer of rubber therebetween. A flange extends across the mouth of the recess, the block extending through an opening in the flange slightly larger than the block. A membrane yieldable in the vertical direction holds the block in position in the opening.

BACKGROUND OF THE INVENTION

Field of the invention

The invention relates to an arrangement for transmitting forces to load cells, particularly in weighing bridges.

The prior art

In large weighing means there is usually a weighing bridge supported by a number of load cells and the object to be weighed is placed upon the weighing bridge. The various load cells register individually the pressures to which they are subjected and a summation of the output signals from the various load cells indicates the total load on the weighing bridge.

In certain cases it may be difficult, if not impossible, to construct a single weighing bridge because of space limitations. In this case it may be suitable instead to arrange a number of weighing surfaces each having a limited area on which the object to be weighed is placed. As examples of such objects may be mentioned containers of various types, pouring ladles and the like. The load cells are then arranged in pockets or recesses in the framework or beams and the weighing surfaces on which the object to be weighed is placed comprise pressure-transmitting journalling elements which rest on the load cells. A field in which such weighing means are particularly suitable is the steel industry where the melt from furnaces is tapped into a pouring ladle placed near the furnace. When the melt is tapped into the pouring ladle it is often desirable to have a check on the quantity of melt tapped into the ladle and a weighing means is therefore arranged in front of the furnace so that the pouring ladle can be placed directly on the weighing means. As another example may be mentioned weighing pouring ladles for continuous casting. The pouring ladle is usually suspended in a crane and when the ladle is placed on the scales it often moves obliquely downwards which causes a considerable lateral force on the scales when the ladle is put down. These lateral forces are not desirable since they may cause damage to the load cells.

SUMMARY OF THE INVENTION

The present invention aims at eliminating the influence of such lateral forces and comprises a means for positioning the pressure-transmitting journalling elements in weighing means where the object to be weighed is placed on one or more well-defined weighing surfaces and the pressure-sensing load cell is arranged in a notch in a framework supporting the weighing means and the pressure force from the object is transmitted to the load cell through the journalling element which consists of two metal plates separated by a spacer of rubber or other elastomeric material. The invention is characterised in that one of the metal plates of the journalling element abuts the contact point of the load cell and that the journalling element extends through an opening in a flange arranged above the framework so that the other metal plate of the journalling element has its free surface above the free surface of the flange and its other surface below the free surface of the flange and the area of the flange opening is slightly greater than the area of the journalling element, and that the journalling element is fixed in the flange opening since the metal plate abutting the load cell is joined to the flange by means of a laterally stiff membrane which yields in the direction of the pressure force.

BRIEF DESCRIPTION OF THE DRAWINGS

The accompanying drawing shows partly in section one embodiment of the invention.

DESCRIPTION OF THE PREFERRED EMBODIMENTS

In a frame 1, which may be a supporting beam in a ladle carriage, a recess 2 is cut out for a load cell 3. The load cell consists of a holder known per se for a pressure-sensing transducer. The force contact point of the load cell consists of a ball 4 arranged on the upper side. Above the frame 1 is a flange 5, which may be part of the ladle carriage, where the weighing means is mounted. In the flange is an opening 6 cut out straight across the load cell. In the opening is a journalling element to transmit the pressure force from the object to be weighed to the load cell. The journalling element consists of an upper metal plate 7, a lower metal plate 8 and a spacer 9 of rubber or similar elastomeric material. The spacer is vulcanised to the metal plates and enables the upper plate to be laterally displaced in relation to the lower plate if the upper plate is subjected to lateral forces, for example if a pouring ladle suspended in a crane is lowered to the weighing means at the same time as it is moved sideways. The lower plate 8 is prevented from moving sideways by a membrane 10 which is rigid in the horizontal plane and attached partly to the plate 8 and partly in the flange 5 or some other rigid part of the frame 1. The membrane is, however, yielding in vertical direction so that it does not influence the weighing forces. Furthermore, the lower plate rests on the ball 4 of the load cell.

As is clear from the drawing, the upper plate 7 extends somewhat above the flange 5 and thus forms a well-defined weighing surface.

The lower surface of the plate which is vulcanised to the rubber plate 9, is lower than the upper surface of the flange 5. As mentioned earlier, the opening 6 has an area somewhat greater than the surface of the journalling element so that a gap is formed between the flange 5 and the plate 7 having a width of a few mm, for example 5 mm. The rubber plate 9 is so flexible that, if the upper plate is subjected to a lateral force of sufficient magnitude, the upper plate will be moved sideways so that it meets the flange edge in the opening 6 and the edge thus acts as a stop for the upper plate in the journalling element. When the lateral force decreases as the object to be weighed comes to rest, the upper plate moves back again due to the elasticity of the rubber plate so that the journalling element is free from the edges in the opening 6 and weighing can take place. The membrane 10 keeps the lower plate 8 permanently centered over the load cell 3, while the opening 6 in the flange 5 acts as overload protection for the journalling element when lateral forces arise on the weighing means and thus also protects the load cells from damaging lateral forces.

What is claimed is:

1. Means for positioning the pressure-transmitting journalling elements in weighing means where the object to be weighed is placed on at least one weighing surface and a pressure-sensing load cell is arranged in a recess in a framework supporting the weighing means and the pressure force from the object is transmitted to the load cell through a journalling element which comprises upper and lower metal plates separated by a spacer of elastomeric material, in which the lower of the metal plates of the journalling element abuts the contact point of the load cell and the journalling element extending through an opening in a flange arranged above the framework, the upper metal plate of the journalling element having its free surface above the free surface of the flange and its other surface below the free surface of the flange and the area of the flange opening being slightly greater than the area of the journalling element, the journalling element being laterally fixed in the flange opening by a laterally stiff membrane which is flexible in the direction of the pressure force connected to the lower metal plate and to the flange.

References Cited

UNITED STATES PATENTS

| 2,868,570 | 1/1959 | Hines et al. | 177—211 XR |
| 2,973,641 | 3/1961 | Webster | 177—208 XR |
| 3,261,417 | 7/1966 | Golding | 177—208 |

FOREIGN PATENTS

| 696,472 | 10/1964 | Canada. |
| 959,352 | 6/1964 | Great Britain. |

ROBERT S. WARD, Jr., Primary Examiner

U.S. Cl. X.R.

73—141; 177—208, 211